United States Patent [19]

Eisenberg et al.

[11] 4,311,499
[45] Jan. 19, 1982

[54] APPARATUS AND METHOD FOR PRODUCTION OF MINERAL FIBERS

[75] Inventors: Arnold J. Eisenberg; Neil E. Greene; Hellmut I. Glaser, all of Granville, Ohio

[73] Assignee: Owens-Corning Fiberglas Corporation, Toledo, Ohio

[21] Appl. No.: 185,110

[22] Filed: Sep. 8, 1980

[51] Int. Cl.³ ............................................ C03B 37/025
[52] U.S. Cl. ............................................. 65/1; 65/2; 65/12
[58] Field of Search ................................. 65/1, 20, 12

[56] References Cited

U.S. PATENT DOCUMENTS

| 2,489,508 | 11/1949 | Stalego | 65/1 |
| 2,706,365 | 4/1955 | Stalego | 65/12 |
| 2,783,590 | 3/1957 | Stalego | 65/12 |
| 3,309,184 | 3/1967 | Stalego | 65/1 |
| 4,202,680 | 5/1980 | Thompson | 65/12 |

FOREIGN PATENT DOCUMENTS 1175821 9/1961 Fed. Rep. of Germany ............ 65/1

*Primary Examiner*—Robert L. Lindsay, Jr.
*Attorney, Agent, or Firm*—Ronald C. Hudgens; Philip R. Cloutier; Kenneth H. Wetmore

[57] ABSTRACT

The present invention embraces apparatus and methods of forming mineral fibers, such as glass. Such invention comprising a mineral fiber forming bushing bottom wall comprising a plurality of tubular members attached together at adjacent sides to form a rigid structure adapted for flow of molten mineral material through the tubular members to form a layer of molten mineral material along the undersurface of the tubular members and rod members projecting below the undersurface of the tubular members. The rod members are attached to the tubular members and are adapted for flow thereon of the molten mineral material from the undersurface of the tubular members for attenuation into fibers.

9 Claims, 4 Drawing Figures

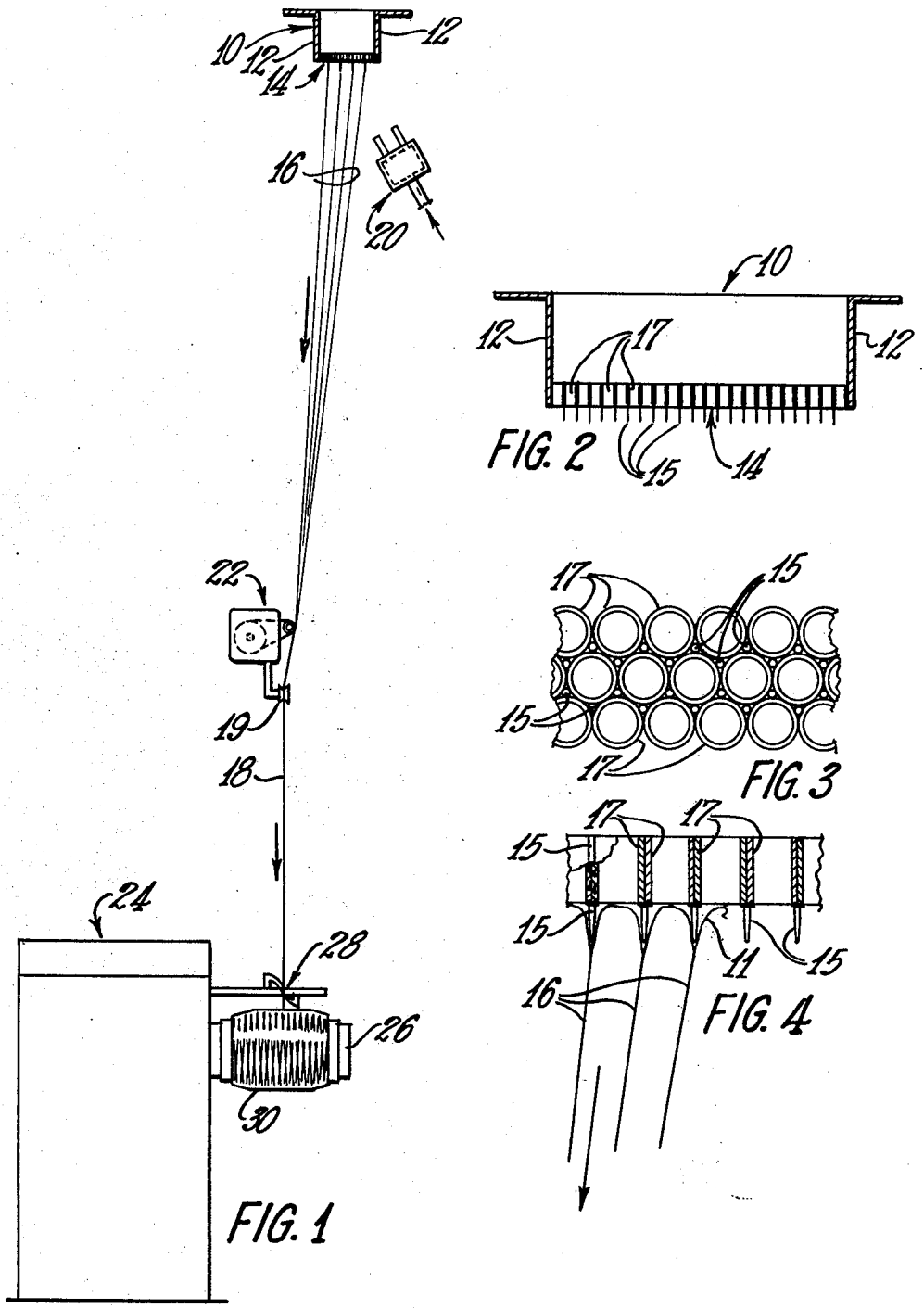

APPARATUS AND METHOD FOR PRODUCTION OF MINERAL FIBERS

TECHNICAL FIELD

The invention relates to apparatus for, and methods of, forming fibers from heat softened mineral material, such as glass. More specifically, this invention relates to bushing or feeder apparatus comprising a bottom wall comprising a plurality of tubular members and rod members attached to the tubular members. Also, more specifically, this invention relates to methods of forming fibers comprising flowing material through such a bushing bottom wall to flood the lower surface of the wall and supplying streams of material for attenuation into fibers by flowing the flooded material over rod members projecting downwardly from the bottom wall.

BACKGROUND OF THE INVENTION

In recent years, there has been considerable interest in the production of mineral fibers such as glass fibers. Due to the increased usage of glass fibers, this interest has particularly focused on improved apparatus and method for the production of such fibers.

In the production of such fibers, molten glass is typically passed through orificed tips in a bushing or stream feeder to create individual cones of glass for the attenuation of fibers therefrom. As the molten streams of glass flow through the orificed projections for attenuation into fibers, the bushing and fiber forming environment are carefully controlled to avoid flooding of the molten glass material along the undersurface of the bushing. If such flooding occurs, the fiber forming operation is disrupted, and thus, production is stopped.

By use of Applicants' invention, this fiber forming disruption problem because of bushing flooding is eliminated. In fact, the tendency of molten material to flood is capitalized on by Applicants' fiber forming apparatus and method in that the streams of material for attenuation into fibers are drawn from a deliberately flooded housing.

SUMMARY OF THE INVENTION

The present invention comprises a bushing for the production of mineral fibers such as glass. The bushing comprises upwardly extending sidewalls and a bottom wall extending between the sidewalls. The bottom wall comprises a plurality of tubular members attached together at their adjacent sides to form a rigid structure which is adapted for flow of molten mineral material through the tubular members from a supply above to form a layer of molten mineral material along the undersurface of the tubular members. The bottom wall further comprises rod members projecting below the undersurface of the tubular members. The rod members are attached to the tubular members such as at the intersection of three or more tubular members. The rod members are adapted for flow thereon of the molten mineral material from the undersurface of the tubular ducts for attenuation into mineral fibers.

The present invention further comprises an apparatus for forming mineral fibers comprising a stream feeder for flowing streams of molten mineral material, means attenuating fibers from the streams of molten mineral material, and means for directing gas upwardly into contact with the streams of molten mineral material at a velocity and in an amount effective to convey away from the streams sufficient heat to render the material of the streams attenuable into fibers, with the improvement comprising a stream feeder bottom wall which comprises a plurality of tubular members adapted for flow of molten mineral material therethrough to form a layer of molten mineral material along the undersurface of the tubular members and rod members projecting below the undersurface of the tubular members. The rod members are adapted for flow thereon of the molten mineral material from the flooded undersurface of the tubular members to supply streams for attenuation into fibers.

The present invention comprises a method of forming mineral fibers. The method comprises flowing molten mineral material through a bushing bottom wall comprising a plurality of tubular members to flood the lower surface of the bottom wall with the material, supplying streams of the material from the flooded materials by flowing the material over rod members projecting downwardly from the bottom wall, and attenuating fibers from the streams of molten mineral material. The method can further comprise the step of directing gas into contact with the streams of material at a velocity and in an amount effective to convey away from the streams sufficient heat to render the material of the streams attenuable into fibers.

An object of the invention is an improved apparatus and method for the production of mineral fibers, such as glass fibers.

Another object of the invention is to provide an improved bushing for use in the manufacture of mineral fibers, such as glass fibers.

These and other objects of the invention will become more apparent as the invention is described hereinafter in detail with reference to the accompanying drawings.

DESCRIPTION OF THE DRAWINGS

FIG. 1 is a semi-schematic elevational view of a fiber forming apparatus in accordance with the invention.

FIG. 2 is an enlarged sectional view of the bushing of FIG. 1.

FIG. 3 is a top view of a portion of the bushing bottom wall of FIG. 2.

FIG. 4 is an enlarged side view of a portion of the bushing bottom wall area of FIG. 2.

DESCRIPTION OF THE PREFERRED EMBODIMENTS

Before explaining the present invention in detail, it is to be understood that the invention is not limited in application to the details of construction and arrangement of the parts illustrated in the accompanying drawings, since the invention is capable of other embodiments and of being practiced or carried out in various ways to produce elements for other end uses. Also, it is to be understood that the phraseology employed herein is for the purpose of description and not of limitation.

While the apparatus and method of the invention have particular utility in the processing of glass for forming fibers or filaments, it is to be understood that the apparatus and method can be employed for producing fibers from other materials.

Referring to the drawings in detail, FIG. 1 illustrates a fiber forming operation. Mineral material, such as glass, is maintained in a molten condition in bushing or stream feeder assembly 10. The bushing assembly comprises upwardly extending sidewalls 12 and bottom wall assembly 14 which will be described in more detail later. Fibers 16 are attenuated from molten glass material passing through the bushing assembly. The fibers are coated by size applicator 22 and gathered into strand 18 by gathering shoe 19. The strand is then collected by winder assembly 24. The strand is reciprocated by traverse 28 for collection into a package 30 on winder collet 26.

To control the glass fiber forming environment, blower means 20 is provided. This blower means directs gas, such as air, upwardly into contact with the molten material passing through the bushing at a velocity and in an amount effective to convey away from the streams sufficient heat to render the material attenuable into fibers. Such a blower assembly is described in U.S. Pat. No. 4,202,680 issued May 13, 1980, and is hereby incorporated by reference.

In general, the bushing has a base plate comprising a series of closely packed thin walled tubes joined by diffusion bonding or some other joining technique. The spaces between adjacent tubes can be closed to stop flow of material therethrough with projections or rod members extending downwardly from the spaces between adjacent tubes to aid in separation and fiberization of the molten mineral material flooded along the undersurface of the tubes. The tubes are of appropriate size and wall thickness to uniformly meter the desired amount of material through the bushing to cover or flood the underneath surface of the bushing bottom wall (lower surface or face of the tubes).

One method of producing such a bushing bottom wall is to take relatively long (such as, for example, in the range of from about three inches to about six inches) lengths of the desired size tubing and bundle them together along their lengths. The tubing length can be at least several times the length of the final desired bottom wall thickness. The tubular members are then diffusion bonded along their adjacent side walls to form a rigid structure. The rigid structure is then cut to the desired thickness for the bushing bottom wall by, for example, the use of a travelling wire electrical discharge machine (EDM). The bottom wall thickness can, for example, be in the range of from about sixty mils to about two hundred mils. The rod members or projections can then be placed in position and welded or diffusion bonded to the bottom wall. The upwardly extending bushing side walls are then connected to the bottom wall, such as by welding, and the remainder of the bushing assembly is produced in conventional fashion.

It may be desirable to provide an internal support system for th bushing bottom wall. For example, an egg crate structure, gusset assembly system or other conventional support system can be welded or otherwise secured inside the bushing assembly to restrict sagging of the bottom wall during operation.

FIGS. 2–4 show the bushing assembly in more detail. As shown, the bottom wall assembly 14 is connected to the upwardly extending sidewalls 12. This can be done by diffusion bonding, welding or other conventional attaching techniques. The bottom wall assembly comprises a plurality of tubular members 17 and rod members or projections 15. The sidewalls, tubular members and rod members can all be made of a platinum-rhodium alloy or other materials which perform in the high temperature fiber forming environment.

As shown in FIG. 3, the tubular members 17 are circular in cross section and are attached at their adjacent sides to form the rigid structure. It is within the scope of this invention that the tubular members have other cross sectional shapes, such as, for example, triangular, square, oval or rectangular. The wall thickness of the tubular member and the size of the opening therethrough are determined by the strength and rigidity needed in the bottom wall for structural soundness during operation as well as by the desired glass flow through the bushing. Preferably the tubular openings are designed for substantially the same flow rate of material therethrough as will be attenuated away into fibers during operation. Although the flow passages are shown to be uniform along the surface of the bottom wall, it is within the scope of the invention that some areas of the bottom wall would have larger flow passages than other areas of the wall for a particular desired flow through the bottom wall. A uniformly metered flow of glass flooding over the bottom surface of the bushing is, however, preferred.

As shown, rod members or projections 15 are placed along the outside wall surfaces of the tubular members at the intersections of several members. In the case of circular tubular members as shown, the rod members are positioned at the intersection of three tubular members. The rod members are adapted for flow thereon of the molten mineral material flooding the undersurface of the tubular members for attenuation into fibers. It is preferred that the rod members have a relatively short length projecting below the bottom wall such as, for example, in the range of from about 40 mils to about 150 mils. It is preferred that the rod members be relatively small in diameter such as, for example, in the range of from about 20 mils to about 40 mils and that the end region of each rod member projecting beneath the bottom wall have a conical shape. The rod members can have other cross sectional shapes, such as, for example, square. The rod members can terminate with a sharp point as shown or be flat or rounded. Also, the rod members are shown to be solid in construction but it is within the scope of the invention that they be hollow or of a composite layered construction.

As can be readily seen, such a bushing construction can provide a means for producing a large number of filaments from a small bushing bottom wall area. By the use of tubular members having small diameters, rod members can be placed in a highly dense fashion. For example, the rod members per square inch density (and consequently, resulting fibers per square inch density) can be in the range of from about 50 to about 200.

As shown in FIG. 4, molten glass material flows through the tubular members 17 from above to flood the lower surface of the wall member, and thus, form a layer of glass 11 along the undersurface. Rod members 15 are shown to terminate in a conical shape. Streams of molten material are supplied from the flooded material by flowing the material over rod members 15 projecting downwardly from the bottom wall. Fibers 16 are attenuated from the streams of molten mineral material flowing over the rod members. As shown, an individual fiber is attenuated from each rod member.

Having described the invention in detail, it will be understood that such specifications are given for the sake of explanation. Various modifications and substitutions other than those cited may be made without departing from the scope of the invention as defined in the following claims.

INDUSTRIAL APPLICABILITY

The present invention would be useful in the mineral fiber forming art and, in particular, in the glass fiber forming art.

We claim:

1. A mineral fiber forming bushing comprising:
   (a) upwardly extending sidewalls; and
   (b) a bottom wall extending between the sidewalls comprising a plurality of tubular members attached together at their adjacent sides to form a rigid structure adapted for flow of molten mineral material through the tubular members from a supply above to form a layer of molten material along the undersurface of the tubular members, the undersurface of the tubular members generally forming the undersurface of the bushing, and rod members projecting below the undersurface of the tubular members, the rod members being attached to the tubular members and being adapted for flow thereon of the molten mineral material from the undersurface of the tubular members for attenuation into fibers.

2. The bushing of claim 1 wherein the rod members are attached to the tubular members at the intersection of three or more tubular members.

3. The bushing of claim 1 wherein the end regions of the rod members have a conical shape.

4. The bushing of claim 1 wherein the tubular members and the rod members are of a platinum rhodium alloy.

5. In an apparatus for forming mineral fibers comprising a stream feeder for flowing streams of molten mineral material, means attenuating fibers from the streams of molten mineral material, and means for directing gas upwardly into contact with the streams of molten mineral material at a velocity and in an amount effective to convey away from the streams sufficient heat to render the material of the streams attenuable to fibers, the improvement comprising a stream feeder bottom wall comprising a plurality of tubular members adapted for flow of molten mineral material therethrough to form a layer of molten mineral material along the undersurface of the tubular members, the undersurface of the tubular members generally forming the undersurface of the bottom wall and rod members projecting below the undersurface of the tubular members the rod members being adapted for flow thereon of the molten mineral material from the undersurface of the tubular members to supply streams for attenuation into fibers.

6. The apparatus of claim 5 wherein the tubular members are attached together at their adjacent sides to form a rigid structure.

7. The apparatus of claim 5 wherein the rod members are attached to the tubular members at the intersection of three or more tubular members.

8. A method of forming mineral fibers comprising:
   (a) flowing molten mineral material through a bushing bottom wall comprising a plurality of tubular members to flood the lower surface of the bottom wall with the material, the undersurface of the tubular members generally forming the lower surface of the bottom wall;
   (b) supplying streams of the material from the flooded material by flowing the material over rod members projecting downwardly from the bottom wall; and
   (c) attenuating fibers from the streams of molten mineral material.

9. The method of claim 8 comprising the step of directing gas into contact with the streams of material at a velocity and in an amount effective to convey away from the streams sufficient heat to render the material of the streams attenuable to fibers.

* * * * *